United States Patent
Pruessel et al.

(10) Patent No.: US 9,856,689 B2
(45) Date of Patent: Jan. 2, 2018

(54) METHOD AND DEVICE FOR DETERMINING THE OFFSET OF AN ELECTRIC WINDOW LIFT SYSTEM

(71) Applicant: Robert Bosch GmbH, Stuttgart (DE)

(72) Inventors: Holger Pruessel, Sinzheim (DE); Scott Averitt, Roseville, MI (US); Kumar Saurabh, Bangalore (IN)

(73) Assignee: Robert Bosch GmbH, Stuttgart (DE)

( * ) Notice: Subject to any disclaimer, the term of this patent is extended or adjusted under 35 U.S.C. 154(b) by 206 days.

(21) Appl. No.: 14/763,572

(22) PCT Filed: Jan. 2, 2014

(86) PCT No.: PCT/EP2014/050001
§ 371 (c)(1),
(2) Date: Jul. 27, 2015

(87) PCT Pub. No.: WO2014/117961
PCT Pub. Date: Aug. 7, 2014

(65) Prior Publication Data
US 2015/0354260 A1 Dec. 10, 2015

(30) Foreign Application Priority Data

Jan. 30, 2013 (DE) ........................ 10 2013 201 448

(51) Int. Cl.
*B60J 1/00* (2006.01)
*E05F 15/695* (2015.01)
(Continued)

(52) U.S. Cl.
CPC ............ *E05F 15/695* (2015.01); *B60J 1/007* (2013.01); *B60J 1/17* (2013.01); *B60J 10/74* (2016.02);
(Continued)

(58) Field of Classification Search
CPC ..................................................... E05F 15/695
(Continued)

(56) References Cited

U.S. PATENT DOCUMENTS

| 4,571,884 A | 2/1986 | Hetmann et al. |
| 6,051,945 A * | 4/2000 | Furukawa ............ H02H 7/0851 318/264 |

(Continued)

FOREIGN PATENT DOCUMENTS

| DE | 19632139 | 7/1997 |
| DE | 19632910 | 10/1997 |

(Continued)

OTHER PUBLICATIONS

International Search Report for Application No. PCT/EP2014/050001 dated Jun. 20, 2014 (English Translation, 2 pages).

*Primary Examiner* — David S Luo
(74) *Attorney, Agent, or Firm* — Michael Best & Friedrich LLP

(57) ABSTRACT

The invention relates to a method for operating an electric window lift system for electrically moving a vehicle door window by means of a cable, according to which, based on the length change of the cable, the offset of the movement of the window is determined, in which the charge modification of the electric motor is monitored, the offset being used to exactly position (opening, closing) the window.

10 Claims, 4 Drawing Sheets

(51) Int. Cl.
    *E05F 15/697*     (2015.01)
    *E05F 15/41*      (2015.01)
    *B60J 1/17*       (2006.01)
    *G05B 19/042*     (2006.01)
    *G05B 19/404*     (2006.01)
    *B60J 10/74*      (2016.01)

(52) U.S. Cl.
    CPC ............ *E05F 15/41* (2015.01); *E05F 15/697* (2015.01); *G05B 19/0426* (2013.01); *G05B 19/404* (2013.01); *E05F 2700/00* (2013.01); *G05B 2219/2628* (2013.01); *G05B 2219/2637* (2013.01)

(58) Field of Classification Search
    USPC .................................................. 318/101, 34
    See application file for complete search history.

(56) References Cited

U.S. PATENT DOCUMENTS

| | | | | |
|---|---|---|---|---|
| 6,086,177 A * | 7/2000 | Driendl | ................ | H02H 7/0851 |
| | | | | 318/286 |
| 6,766,273 B2 | 7/2004 | Kahles | | |
| 7,307,393 B2 * | 12/2007 | Bizard | ................ | H02H 7/0851 |
| | | | | 318/282 |
| 8,590,210 B2 * | 11/2013 | Schindhelm | .......... | E05F 15/695 |
| | | | | 296/146.2 |

FOREIGN PATENT DOCUMENTS

| | | |
|---|---|---|
| DE | 10015856 | 10/2001 |
| DE | 102012100944 | 8/2012 |

\* cited by examiner

METHOD AND DEVICE FOR DETERMINING THE OFFSET OF AN ELECTRIC WINDOW LIFT SYSTEM

BACKGROUND OF THE INVENTION

The present invention relates to electric window lifters for motor vehicles, in particular window lift systems for frameless vehicle doors.

In particular in convertibles, frameless vehicle doors are used in which the vehicle window pane can be moved electrically out of the body of the door. In frameless vehicle doors, the rubber seal is not part of the door structure but instead attached to the vehicle roof. If the vehicle door is opened, the window glass must be automatically lowered somewhat in order to protect the seal from damage if the glass presses laterally on the seal. When the vehicle door closes, the window pane then moves automatically upward into the rubber seal to the stop.

However, there is a requirement that the movement distance by which the window pane is lowered is sufficiently large so that the upper edge of the window pane is located below the seal but not by more than 4 mm. These requirements are a component of safety rules which provide that an anti-trapping protection must be implemented during the closing of the window if the upper edge of the window pane is at a distance of more than 4 mm from the lower edge of the seal.

However, the anti-trapping protection cannot be activated if the motor which drives the window pane has not assumed a specific stable speed, and there is therefore the risk that it will not be possible to satisfy the safety requirements during the upward movement or the closing if the window pane is moved by somewhat more than 4 mm below the lower edge of the seal. If, on the other hand, the upper edge of the window pane is not lowered sufficiently below the lower edge of the seal, the seal can be damaged during the opening and closing of the vehicle door.

Furthermore, these requirements are to be complied with over a temperature range from −40° C. to 80° C.

Electric window lift systems usually have a DC motor as a drive motor, which is coupled mechanically to the window pane. The mechanical coupling comprises, inter alia, a linkage and a wire cable.

The position of the drive motor is determined using a Hall sensor which senses the number of revolutions of the drive motor. Owing to the mechanical coupling of the drive motor to the window pane, the number of revolutions corresponds to a movement distance of the window pane. It is therefore possible to estimate the position of the window pane on the basis of the revolutions of the motor sensed by the Hall sensor.

However, the number of measured revolutions of the drive motor does not always correspond to the precise position of the window pane, since the window pane does not also immediately move with the beginning of the movement of the drive motor, at least starting from the upper stop of said window pane. This is caused, inter alia, by the fact that the mechanical connection between the drive motor and the window pane has play and in addition contains the wire cable which cannot be completely tensioned at the time of starting of the drive motor. Furthermore, the extension of the wire cable depends to a great extent on the temperature and the aging, with the result that the determination of the position using the Hall sensor is not sufficient to determine in advance with sufficient accuracy the actual movement distance for the lowering of the window pane.

Document DE 100 15 856 A1 discloses a method for determining the residual running time of a drive until a stop is reached, wherein in each case the position of the window pane relative to a mechanical stop is sensed, the time difference between two incremental signal generator pulses in the vicinity of the mechanical stop is determined, and the remaining residual running time of the electric drive until the mechanical stop is reached is calculated.

The object of the present invention is to make available a method with which a window pane can be moved during the opening of a vehicle door, in such a way that the upper edge of said window pane is located in a region at a predefined distance, for example of less than 4 mm, below the seal.

SUMMARY OF THE INVENTION

This object is achieved by means of the method for operating a window lift system for a vehicle door, and by means of the device, the window lift system, the vehicle and the computer program product.

According to a first aspect, a method for operating an electric window lift system for electrically moving a window pane for a vehicle door is provided, comprising the following steps:
  when a status signal is received, starting of a drive motor which is coupled to the window pane via a mechanical connection; and
  stopping of the drive motor at a stop position which depends on a predefined change in position and on a position specification of the drive motor relating to the change in position of the drive motor since the starting;
  wherein an offset is determined which specifies the change in position of the drive motor between the starting of the drive motor and an occurrence of a change in load after a runup of the drive motor, wherein the stop position also depends on the determined offset.

The above method provides for determination of the offset which occurs owing to the play in a mechanical connection between the drive motor and the window pane and/or owing to the use of the wire cable in the coupling between the drive motor and the window pane, and for said offset to be taken into account in the actuation of the drive motor in order to move the window pane by a certain movement distance.

The offset is determined as a function of a change in load after running up of the drive motor, wherein it is assumed that the change in load occurs after the overcoming of the play in the mechanical connection between the drive motor and the window pane.

Since this offset is determined anew whenever the vehicle door is opened, fluctuations which occur owing to the temperature or changes in the mechanics and the aging can be taken into account continuously.

Furthermore it can be provided that the status signal specifies that the vehicle door is to be opened.

According to one embodiment, the predefined change in position can specify a change in position of the drive motor, which change in position corresponds to a change in position of the window pane starting from a stop of the window pane.

The stop position can correspond to a sum of the offset and of the predefined change in position.

It can be provided that the drive motor is started only if it is detected that the window pane is at a stop.

In particular, the change in load can be detected on the basis of a change in rotational speed of the drive motor.

According to a further aspect, a device for operating an electric window lift system for electrically moving a window pane for a vehicle door is provided, wherein the device is designed:

to start a drive motor when a status signal is received, which drive motor is coupled to the window pane via a mechanical connection;

to stop the drive motor at a stop position which depends on a predefined change in position and on a position specification of the drive motor relating to the change in the position of the drive motor since the starting; and to determine an offset which specifies the change in position of the drive motor between the starting of the drive motor and an occurrence of a change in load after a runup of the drive motor, wherein the drive motor is stopped as a function of the determined offset.

According to a further aspect, a window lift system is provided which comprises a drive motor, a window pane which is coupled to the drive motor via a mechanical connection, and the above device.

In one embodiment, the mechanical connection of the window lift system can have a wire cable.

According to a further aspect, a vehicle is provided having a vehicle door and a window lift system provided in the vehicle door, wherein the vehicle door is embodied in a frameless fashion, with the result that when the vehicle door is closed, the window pane in the closed state is accommodated in a seal which is not connected to the vehicle door.

According to a further aspect, a computer program product is provided which contains a program code which, when it is executed on a data processing device, in particular the above device, carries out the above method.

BRIEF DESCRIPTION OF THE DRAWINGS

Preferred embodiments of the present invention are explained in more detail below on the basis of the appended drawings, in which.

DETAILED DESCRIPTION

Figure 1:
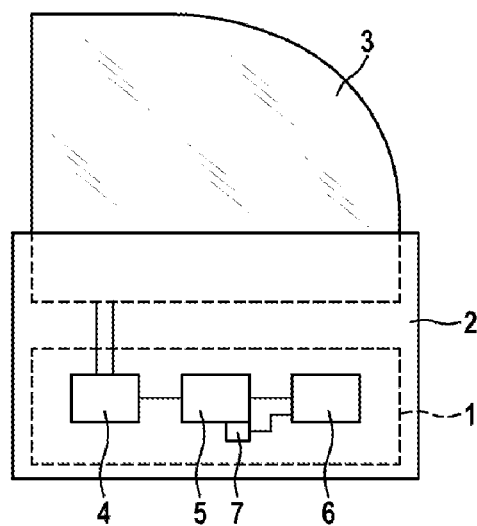
FIG. 1 shows a schematic illustration of a window lift system in a vehicle door.

FIG. 1 shows a schematic illustration of a window lift system 1 in a vehicle door 2. The vehicle door 2 is frameless and contains a window pane 3 which can be moved by means of the window lift system 1. For this purpose, the window pane 3 is coupled via a mechanism 4 (mechanical connection) to a drive motor 5, with the result that when the drive motor 5 is operated the window pane 3 can be moved upward or downward.

The drive motor 5 is actuated by means of a control unit 6, to which an operator control signal for moving the window pane 3 or a status signal can be made available from the outside, which operator control signal specifies whether the vehicle door 2 is to be opened. The operator control signal can be made available, for example, by an operator control element.

The control unit 6 is also coupled to a rotation sensor 7 (position sensor) on the drive motor 5. The rotation sensor 7 can be embodied as a sensor which, in the case of a rotation of a shaft of the drive motor 5, outputs sensor signals in the form of pulses for each further rotation of the shaft by a specific angular range. The rotation sensor 7 can therefore make available a sensor signal, for example, at each completed rotation of the shaft of the drive motor 5. The rotation sensor 7 can be embodied as a magnetic or optical sensor such as, for example, a Hall sensor, GMR sensor or the like.

In the case of a frameless vehicle door 2, when complete closing occurs the window pane 3 moves into a seal connected to the vehicle door 2, provided that the soft top of the respective vehicle is closed. It is therefore necessary, when opening the vehicle door 2, firstly to move the window pane 3 out of the seal before the vehicle door 2 can be pivoted for the purpose of opening, since otherwise it is not possible to rule out damage to the seal.

In order to ensure this, when the corresponding status signal which indicates that the vehicle door 2 is to be opened is received, the control unit 6 actuates the drive motor 5 in order to move the window pane 3 downward by a specific movement distance, with the result that the window pane 3 moves out of the seal. However, owing to safety regulations it must be ensured that the window pane 3 is not moved so far out of the seal that the distance between the lower edge of the seal and the upper edge of the window pane 3 is more than 4 mm, since otherwise measures for implementing an anti-trapping protection would have to be activated.

In order to avoid the activation of the anti-trapping protection, it is now to be ensured that the movement of the window pane 3 out of the seal takes place in such a way that after the movement the distance of the lower edge of the seal and the upper edge of the window pane 3 is not more than a predefined distance, for example 4 mm. However, in this context the play mentioned at the beginning and the mechanical coupling via the wire cable must be taken into account. This generally gives rise to a situation in which the drive motor 5 has to rotate by several revolutions before the window pane 3 starts to move. As soon as the window pane 3 starts to move, the movement distance of the window pane 3 can be determined on the basis of the revolutions of the drive motor 5, given knowledge of the transmission behavior of the mechanical coupling between the drive motor 5 and the window pane 3.

Figure 2:
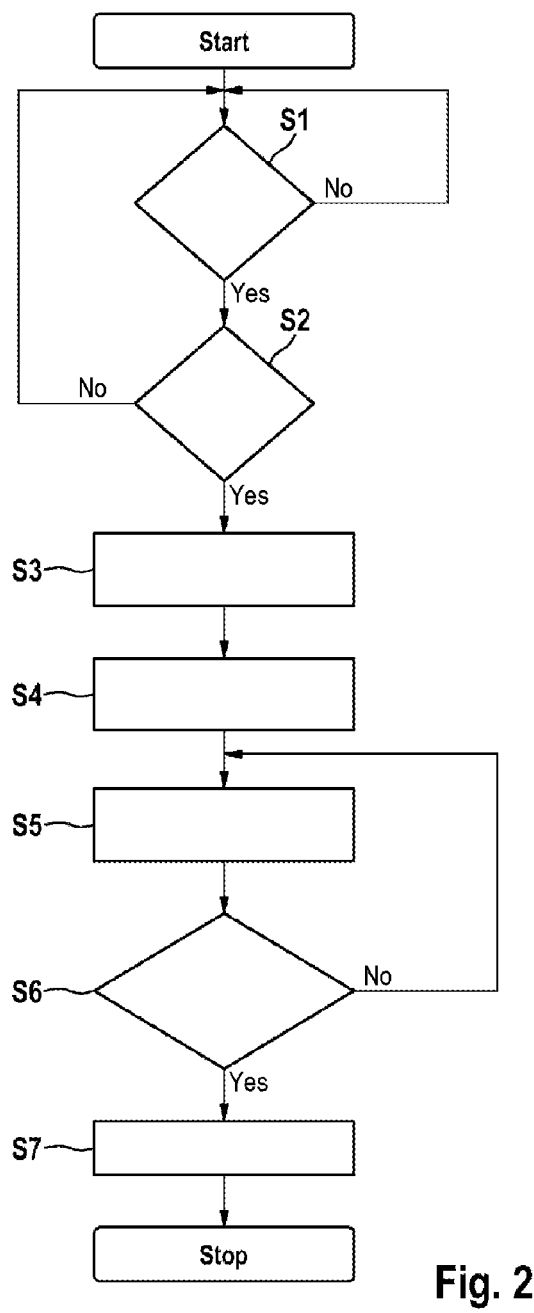
FIG. 2 shows a flowchart illustrating a method for operating the window lift system in the case of opening of the vehicle door.

On the basis of the flowchart in FIG. 2, a method for operating a window lift system 1 for a frameless vehicle door 2 will be described in more detail below.

In a step S1 it is initially checked whether a status signal has been received which indicates that the vehicle door 2 is to be opened. If this is the case (alternative: yes), the method is continued with step S2. Otherwise (alternative: no), the method jumps back to step S1.

In step S2, it is subsequently checked whether the position of the window pane 3 is in the region of the seal. In other words it is to be detected whether the window pane 3 is opened or completely closed. If it is detected in step S2 that the window pane 3 is moved into the seal and completely closed (alternative: yes), the method is continued with step S3. Otherwise (alternative: no), the method jumps back to step S1.

In step S3, the drive motor 5 is started in order to move the window pane 3 to open. The drive motor 5 is for this purpose actuated continuously in a specific direction assigned to the opening of the window pane. In the case of a DC motor as a drive motor 5, for example a constant supply voltage can be applied to the DC motor.

In a subsequent step S4, an offset V is determined between the starting of the drive motor 5 and the start of a resulting movement of the window pane 3, for example in the form of the number of sensor signals or some other absolute position indication of the rotor of the drive motor 5. The offset V can be determined, for example, by detecting the occurrence of a change in rotational speed after the running up of the drive motor 5. As soon as the window pane 3 is not entrained by the rotation of the drive motor 5, the rotational speed increases quickly to a relatively high idling speed $n_L$ since the load acting against the drive torque of the drive motor 5 is negligible or very small. As soon as the mechanism 4 has overcome the play and/or the wire cable is tensioned and as a result there is direct coupling of the movement of the drive motor 5 and of the window pane 3, an increased load torque acts on the drive motor 5, which load torque results in a reduction in the idling speed $n_L$ to a working rotational speed $n_A$. The increased load torque is produced, in particular, by the fact that the window pane 3 is located in the seal and has to be moved out of the seal counter to the contact pressure of seal lamellae.

An increased load torque can be detected by means of a significant reduction in the rotational speed. Monitoring of the rotational speed is therefore carried out in the control unit, which monitoring determines a rotational speed of the drive motor 5 on the basis of the sensor signals per time unit or the time between two successive sensor signals. If, after the starting of the drive motor 5 or after the end of running up thereof which, in the loadless case, already occurs after fewer than one or several revolutions, a significant decrease in the determined rotational speed occurs, which decrease can be determined, for example, by means of a threshold value comparison, the overcoming of the play in the coupling between the drive motor 5 and the window pane 3 is thus detected.

The control unit 6 detects the number of revolutions of the drive motor 5 from the start of the drive motor 5 up to the time of the decrease in the rotational speed from an idling speed $n_L$, assumed immediately after the starting of the drive motor 5, to the relatively low working rotational speed $n_A$. In this way, the change in position of the rotor of the drive motor 5, or the number of revolutions which make up the offset V, is determined.

Figure 3A:
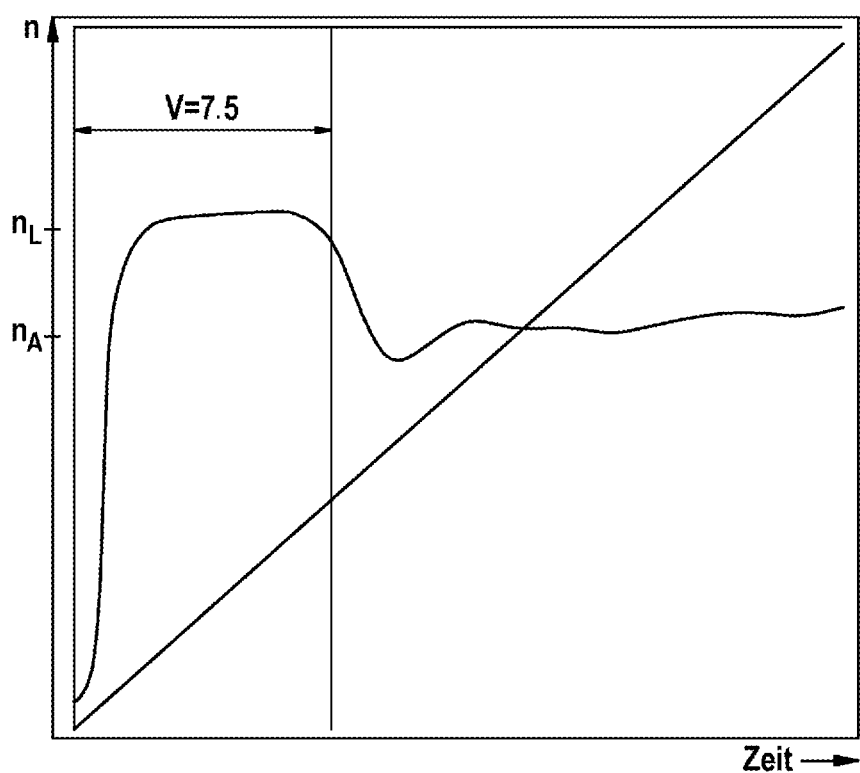
FIGS. 3a to 3c show diagrams illustrating the offset at various ambient temperatures of the window lift system.
Figure 3C:
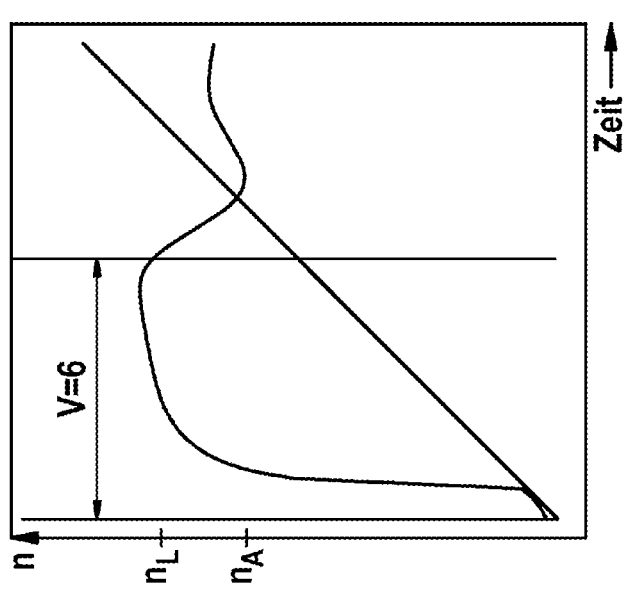
Figure 3B:
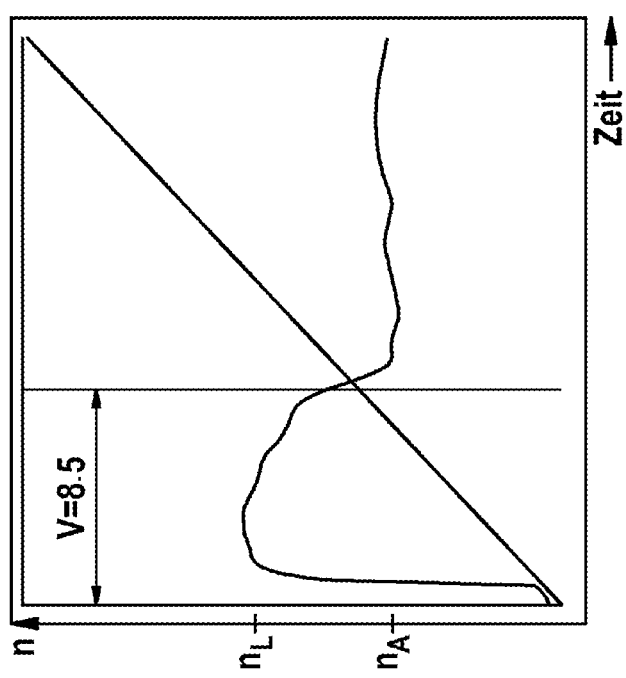

In the rotational speed/time diagrams in FIGS. 3a to 3c it is apparent that the offset V, i.e. the number of revolutions until the play is overcome and/or the wire cable is tensioned, fluctuates considerably depending on the ambient temperature. In the exemplary embodiment shown, the offset V corresponds to the number of 8.5 revolutions at −20° C., 7.5 revolutions at 27° C., and 6 revolutions at +85° C.

Now, the offset V, which specifies a change in the position and is determined in revolutions in the illustrated exemplary embodiment, is subtracted from the actual number of revolutions since the starting of the drive motor 5 (step S5) and it is checked in step S6 whether the number of revolutions determined in this way corresponds to the number of revolutions which corresponds to the predefined movement path of the window pane 3 which is to be lowered. The number of revolutions can be predefined given knowledge of the transmission behavior of the mechanical coupling between the drive motor 5 and the window pane 3.

If it is detected in step S6 that the window pane 3 has been moved by the desired movement distance (alternative: yes), the method is continued with step S7. Otherwise (alternative: no) the method jumps back to step S5.

As soon as the window pane 3 has travelled by the desired movement distance, the drive motor 5 is stopped in step S7.

For the desired movement distance, running on of the drive motor 5 can be taken into account. The amount of running on is dependent on the kinetic energy and is usually 0.5 to 2 revolutions. The drive motor 5 should therefore already be stopped, or disconnected from the electric energy supply, before the number of revolutions corresponding to the desired movement distance is reached. In particular, the running on can be determined as a function of an applied motor voltage and an instantaneous rotational speed.

The determined running on can be corrected within the scope of the above method after each time the movement of the drive motor 5 stops. It is therefore possible to calculate a correction offset which adapts the determined running on to the actual running on. The correction offset can be increased or reduced by a defined amount, i.e. incrementally, depending on whether the determined running on is larger or smaller than the actual running on. The defined amount can be limited to the real resolution of the rotation sensor.

With the above method for operating a window lift system it is therefore possible to determine anew the mechanical play and/or the properties of a coupling wire cable between the drive motor 5 and the window pane 3 as a function of the ambient temperature, the aging and other influences whenever the lowering of the window pane 3 is activated, and it is therefore possible to bring about at any time the same movement distance when the window pane 3 is lowered.

The invention claimed is:

1. A method for operating an electric window lift system for electrically moving a window pane for a vehicle door, comprising the following steps:
   when a status signal is received, starting a drive motor which is coupled to the window pane via a mechanical connection, wherein the status signal specifies that the vehicle door is to be opened; and
   stopping the drive motor at a stop position which depends on a predefined change in position and on a position specification of the drive motor relating to the change in position of the drive motor since the starting;
   determining an offset which specifies the change in position of the drive motor between the starting of the drive motor and an occurrence of a change in load after a run-up of the drive motor, wherein the stop position also depends on the determined offset.

2. The method as claimed in claim 1, wherein the predefined change in position specifies a change in position of the drive motor, which change in position corresponds to a change in position of the window pane starting from a stop of the window pane.

3. The method as claimed in claim 1, wherein the stop position corresponds to a sum of the offset and of the predefined change in position.

4. The method as claimed in claim 1, wherein the drive motor is started only if it is detected that the window pane is at a stop.

5. The method as claimed in claim 1, wherein the change in load is detected on the basis of a change in rotational speed of the drive motor.

6. A computer program product which contains a program code which, when it is executed on a data processing device, carries out the method as claimed in claim 1.

7. A device for operating an electric window lift system for electrically moving a window pane for a vehicle door, wherein the device is designed:
   to start a drive motor when a status signal is received, which drive motor is coupled to the window pane via a mechanical connection, wherein the status signal specifies that the vehicle door is to be opened;
   to stop the drive motor at a stop position which depends on a predefined change in position and on a position specification of the drive motor relating to the change in the position of the drive motor since the starting; and to determine an offset which specifies the change in position of the drive motor between the starting of the drive motor and an occurrence of a change in load after a run-up of the drive motor, wherein the drive motor is stopped as a function of the determined offset.

8. The window lift system as claimed in claim 7, wherein the mechanical connection is a wire cable.

9. A window lift system comprising:
a drive motor;
a window pane, which is coupled to the drive motor via a mechanical connection; and
a control unit that
starts a drive motor when a status signal is received, which drive motor is coupled to the window pane via a mechanical connection, wherein the status signal specifies that the vehicle door is to be opened;
stops the drive motor at a stop position which depends on a predefined change in position and on a position specification of the drive motor relating to the change in the position of the drive motor since the starting; and
determines an offset which specifies the change in position of the drive motor between the starting of the drive motor and an occurrence of a change in load after a run-up of the drive motor, wherein the drive motor is stopped as a function of the determined offset.

10. A vehicle having a vehicle door and a window lift system provided in the vehicle door, wherein the vehicle door is embodied in a frameless fashion, with the result that when the vehicle door is closed, the window pane in the closed state is accommodated in a seal which is not connected to the vehicle door,
wherein the window lift system includes
a drive motor,
a window pane, which is coupled to the drive motor via a mechanical connection, and
a control unit that
starts a drive motor when a status signal is received, which drive motor is coupled to the window pane via a mechanical connection, wherein the status signal specifies that the vehicle door is to be opened,
stops the drive motor at a stop position which depends on a predefined change in position and on a position specification of the drive motor relating to the change in the position of the drive motor since the starting, and
determines an offset which specifies the change in position of the drive motor between the starting of the drive motor and an occurrence of a change in load after a run-up of the drive motor, wherein the drive motor is stopped as a function of the determined offset.

* * * * *